US010073782B2

(12) United States Patent
Forsell (10) Patent No.: US 10,073,782 B2
(45) Date of Patent: Sep. 11, 2018

(54) MEMORY UNIT FOR DATA MEMORY REFERENCES OF MULTI-THREADED PROCESSOR WITH INTERLEAVED INTER-THREAD PIPELINE IN EMULATED SHARED MEMORY ARCHITECTURES (71) Applicant: TEKNOLOGIAN TUTKIMUSKESKUS VTT OY, Vtt (FI)

(72) Inventor: Martti Forsell, Oulu (FI)

(73) Assignee: TEKNOLOGIAN TUTKIMUSKESKUS VTT OY, (Espoo) VTT (FI)

( * ) Notice: Subject to any disclaimer, the term of this patent is extended or adjusted under 35 U.S.C. 154(b) by 285 days.

(21) Appl. No.: 14/892,446

(22) PCT Filed: May 21, 2014

(86) PCT No.: PCT/FI2014/050391
§ 371 (c)(1),
(2) Date: Nov. 19, 2015

(87) PCT Pub. No.: WO2014/188073
PCT Pub. Date: Nov. 27, 2014

(65) Prior Publication Data
US 2016/0124856 A1 May 5, 2016

(30) Foreign Application Priority Data
May 22, 2013 (EP) .................................. 13168732

(51) Int. Cl.
*G06F 12/08* (2016.01)
*G06F 9/38* (2018.01)
(Continued)

(52) U.S. Cl.
CPC ........ *G06F 12/0842* (2013.01); *G06F 9/3004* (2013.01); *G06F 9/38* (2013.01);
(Continued)

(58) Field of Classification Search
None
See application file for complete search history.

(56) References Cited

U.S. PATENT DOCUMENTS 6,574,725 B1 * 6/2003 Kranich .............. G06F 9/30087
709/208
6,651,163 B1 * 11/2003 Kranich ................ G06F 9/3004
712/220

(Continued)

FOREIGN PATENT DOCUMENTS

WO 0033183 A1 6/2000

OTHER PUBLICATIONS

Adler et al., "LEAP Scratchpads: Automatic Memory and Cache Management for Reconfigurable Logic [Extended Version]", Computer Science and Artificial Intelligence Laboratory Technical Report, Nov. 23, 2010, pp. 1-13, https://people.csail.mit.edu/emer/papers/2011.02.isfpga.leap_scratchpads.pdf.*

(Continued)

*Primary Examiner* — Christopher D Birkhimer
(74) *Attorney, Agent, or Firm* — Young & Thompson (57) ABSTRACT A memory unit for handling data memory references of a multi-threaded processor with interleaved inter-thread pipeline in emulated shared memory architectures, includes a step cache defining associative cache memory array where data stays valid till the end of ongoing step of multithreaded execution, the memory array incorporating a plurality of cache lines with data fields, each line containing a data field for address tag and data field thread id of the first thread referring to a data memory location specified by the address tag, a scratchpad defining a memory buffer for storing (Continued)

internal data of multioperations, the buffer including a single data field for each processor thread, the memory unit configured to access the step cache for a cache search and scratchpad for retrieving and/or storing internal data at different clock cycles and different stages of the processor pipeline during multioperation execution involving data memory reference by the processor.

22 Claims, 4 Drawing Sheets

(51) Int. Cl.
    *G06F 9/30*     (2018.01)
    *G06F 9/52*     (2006.01)
    *G06F 12/0842*     (2016.01)

(52) U.S. Cl.
    CPC ............... *G06F 9/3851* (2013.01); *G06F 9/52* (2013.01); *G06F 2212/1021* (2013.01); *G06F 2212/151* (2013.01); *G06F 2212/608* (2013.01); *G06F 2212/6042* (2013.01); *G06F 2212/62* (2013.01)

(56) References Cited

U.S. PATENT DOCUMENTS 9,183,145 B2 * 11/2015 Sonnier ............... G06F 12/0804
9,218,290 B2 * 12/2015 Sonnier ............... G06F 12/0831
2003/0200398 A1   10/2003 Harris
2008/0141253 A1    6/2008 Luick
2011/0289279 A1 * 11/2011 Sonnier ............... G06F 12/0804
                                                711/144

OTHER PUBLICATIONS

Jul. 24, 2017, CN communication issued for related CN application No. 2014800414698.

Martti Forsell et al.: "Total Eclipse—An Efficient Architectural Realization of the Parallel Random Access Machine", Jan. 1, 2010 (Jan. 1, 2010), pp. 39-64, XP055089190, DOI: 10. 5772/56724 ISBN: 978-9-53-307057-5.

Forsell M.: "Reducing the Associativity and Size of Step Caches in CRCW Operation", Proceedings. 20th International Parallel and Distributed Processing Symposium (IEEE CAT. No. 06TH8860), IEEE Piscataway, NJ, USA, Apr. 25, 2006 (Apr. 25, 2006), pp. 1-7, XP010920496, DOI: 10.1109/IPDPS.2006.1639546 ISBN: 978-1-4244-0054-6.

International Search Report, dated Nov. 6, 2014, from corresponding PCT application.

EP Search Report, dated Nov. 20, 2013, from corresponding EP application.

* cited by examiner

MEMORY UNIT FOR DATA MEMORY REFERENCES OF MULTI-THREADED PROCESSOR WITH INTERLEAVED INTER-THREAD PIPELINE IN EMULATED SHARED MEMORY ARCHITECTURES

FIELD OF THE INVENTION

Generally the present invention pertains to computer science and computer architectures. In particular, the invention relates to the optimization of memory access and multioperations in connection with emulated shared memory architectures.

BACKGROUND

In SMAs (shared memory architecture), data and program partitioning is typically carried out by placing data requiring processing by multiple threads into the shared memory and splitting program more independently to processors, thus making programming easier compared to message passing (MPA) architectures in which processing happens always locally and the programmer is responsible for moving data around accordingly. Unfortunately most SMAs use a distributed shared memory architecture consisting of multiple interconnected processor-cache pairs, which makes cache coherency (and therefore latency tolerance) and synchronicity maintenance very expensive. This may even ruin their performance in communication intensive problems.

To tackle e.g. the above problem, the emulated shared memory (ESM), or shared memory emulation, architectures have been introduced. They incorporate a set of multi-threaded processors that are connected via a high-throughput intercommunication network to a common uniformly and synchronously accessible shared memory. The memory system latency is hidden by overlapping on-going memory references and a special low-cost synchronization mechanism is established guaranteeing synchronicity at machine instruction level. The ESM systems provide the user with perception of ideal shared memory even though the actual hardware architecture comprises a physically distributed memory. From a theoretical standpoint, these architectures attempt to emulate the abstract parallel random access machine (PRAM) that is commonly used as a model for describing and analyzing the intrinsic parallelism of computational problems as well as performance and cost of executing parallel algorithms due to its simplicity and expressivity. A PRAM model generally refers to a set of processors working under the same clock and a uniform single step accessible shared memory connected to them.

Accordingly, ESM is a feasible technique to address programmability and performance scalability concerns of chip multiprocessors (CMP) as it yields implied synchrony in the execution of machine instructions, efficient latency hiding technique, and sufficient bandwidth to route all the memory references even with heavy random and concurrent access workloads. Synchronous execution is considered to make programming easier as a programmer does not need to synchronize the threads of execution explicitly after each global memory access but can rely on the hardware to take care of that automatically, whereas e.g. in message passing architectures (MPA), a programmer is responsible for explicitly defining communication, synchronizing subtasks, and describing data and program partitioning between threads making MPAs difficult to program. Latency hiding used in shared memory emulation makes use of the high-throughput computing scheme, where other threads are executed while a thread refers to the global shared memory. Since the throughput computing scheme employs parallel slackness extracted from the available thread-level parallelism, it is considered to provide enhanced scalability in contrast to traditional symmetric multiprocessors and non-uniform memory access (NUMA) systems relying on snooping or directory-based cache coherence mechanisms and therefore suffering from limited band-width or directory access delays and heavy coherence traffic maintenance.

Recently, scalable ESM architectures have been suggested incorporating step caches to implement the concurrent read concurrent write (CRCW) memory access variant of PRAM, which further simplifies programming and increases performance by a logarithmic factor in certain cases. Also a mechanism to support constant execution time multi(-prefix)operations—implementing even stronger multioperation concurrent read concurrent write (MCRCW) variant of the PRAM model—has been implemented with the help of scratchpads that are attached to step caches in order to bound the associativity of step caches. For instance, publications 1: M. Forsell, Step Caches—a Novel Approach to Concurrent Memory Access on Shared Memory MP-SOCs, In the Proceedings of the 23th IEEE NORCHIP Conference, Nov. 21-22, 2005, Oulu, Finland, 74-77, 2: M. Forsell, Reducing the associativity and size of step caches in CRCW operation, In the Proceeding of 8th Workshop on Advances in Parallel and Distributed Computational Models (in conjunction with the $20^{th}$ IEEE International Parallel and Distributed Processing Symposium, IPDPS'06), Apr. 25, 2006, Rhodes, Greece, 3: M. Forsell, Realizing Multioperations for Step Cached MP-SOCs, In the Proceedings of the International Symposium on System-on-Chip 2006 (SOC'06), Nov. 14-16, 2006, Tampere, Finland, 77-82., 4: M. Forsell, TOTAL ECLIPSE—An Efficient Architectural Realization of the Parallel Random Access Machine, In Parallel and Distributed Computing Edited by Alberto Ros, INTECH, Vienna, 2010, 39-64., and 5: M. Forsell and J. Roivainen, Supporting Ordered Multiprefix Operations in Emulated Shared Memory CMPs, In the Proceedings of the 2011 International Conference on Parallel and Distributed Processing Techniques and Applications (PDPTA'11), Jul. 18-21, 2011, Las Vegas, USA, 506-512, contemplate different aspects of such a solution and are thereby incorporated herein by reference in their entireties. Multi(-prefix)operations can be defined for many basic operations, e.g. ADD, SUB, MAX etc., and considered as parallel primitives due to the capability to express parallel algorithms. They can be used for synchronization and parallel data structures simultaneously accessed by several processors without race conditions and other anomalies of architectures executing threads asynchronously.

Figure 1:
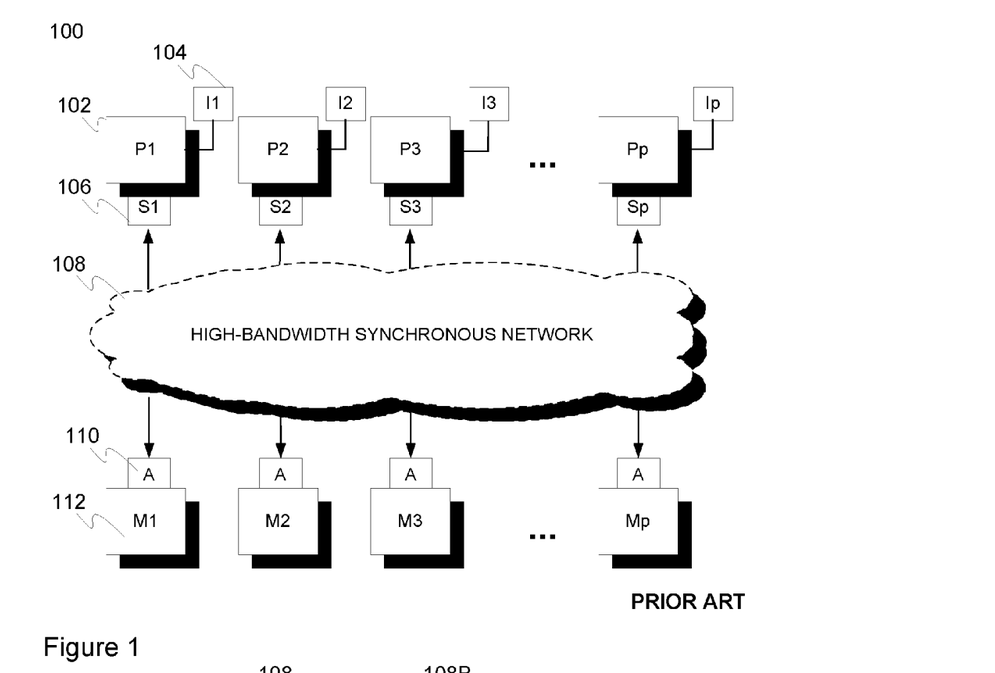
FIG. 1 is a block diagram of a feasible scalable architecture to emulate shared memory on a silicon platform.

In FIG. 1, a high-level illustration of a scalable architecture 100 to emulate shared memory on a silicon platform is shown. It comprises a set of processors (cores) P1, P2, P3, . . . , Pp 102 connected to a physically distributed, but logically shared (data) memory M1, M2, M3, . . . , Mp 112 via a physically scalable high bandwidth interconnection network 108. Active memory units 110 in connection with data memory 112 can be considered as memory control logic units utilized to process the memory references. The active memory units 110 are arranged to manage computation related to cases in which multiple memory references are targeted to the same memory location during, e.g., multioperations that may include multiprefix operations, for instance. Instruction memory modules I1, I2, I3, . . . , Ip 104 are configured to carry the program code for each processor 102. To efficiently emulate shared memory by the distributed memory-based implementation, the processors 102 are multithreaded utilizing a Tp-stage cyclic, interleaved inter-thread pipeline (Tp≥the average latency of the network). The PRAM model is linked to the architecture such that a full cycle in the pipeline corresponds typically to a single PRAM step. During a step of multi-threaded execution (regarding the pipeline in overall, i.e. all pipeline stages including the actual execution stage), each thread of each processor of the CMP executes an instruction including at most one shared memory reference sub-instruction. Therefore a step lasts for multiple, at least Tp+1 clock cycles.

In the depicted architecture, step caches are generally associative memory buffers in which data stays valid only to the end of ongoing step of multithreaded execution. The main contribution of step caches to concurrent accesses is that they step-wisely filter out everything but the first reference for each referenced memory location. This reduces the number of requests per location from P×Tp down to P allowing them to be processed sequentially on a single ported memory module assuming Tp≥P. Scratchpads are addressable memory buffers that are used to store memory access data to keep the associativity of step caches limited in implementing multioperations with the help of step caches and minimal on-core and off-core ALUs (arithmetic logic unit) that take care of actual intra-processor and inter-processor computation for multioperations. Scratchpads may be coupled with step caches to establish so-called scratchpad step cache units S1, S2, S3, ..., Sp 106.

One underlying idea of the reviewed solution is indeed in the allocation of each processor core 102 with a set of threads that are executed efficiently in an inter-leaved manner and hiding the latency of the network. As a thread makes a memory reference, the executed thread is changed and the next thread can make its memory request and so on. No memory delay will occur provided that the reply of the memory reference of the thread arrives to the processor core before the thread is put back to execution. This requires that the bandwidth of the network is high enough and hot spots can be avoided in pipelined memory access traffic. Synchronicity between consecutive instructions can be guaranteed by using an elastic synchronization wave between the steps, for instance.

Figure 2:
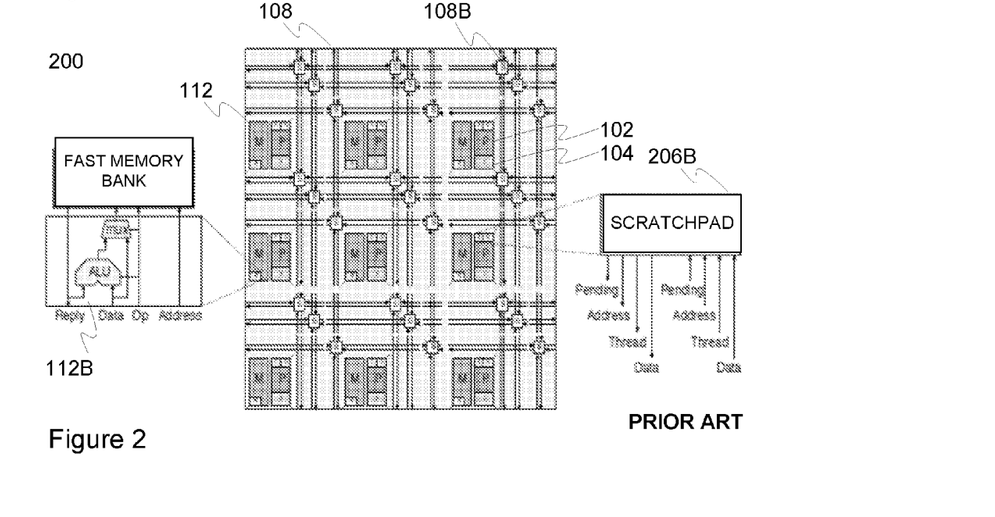
FIG. 2 is another representation of a feasible ESM architecture, essentially CMP ESM architecture.

FIG. 2 shows, at 200, one illustration of an ESM CMP architecture incorporating e.g. the aforementioned active memory units 112B (with ALU and fetcher) in connection with data memory modules 112 and scratchpads 206B. The network 108 may be a mesh-like interconnection network acting as a high-bandwidth pipelined memory system with switches 108B. The memory access latency is hidden by executing other threads while a thread is referencing the uniformly accessible distributed shared memory via the network 108. Congestion of references and hot spots in communication are avoided with an efficient dead-lock free intercommunication architecture featuring high bandwidth (bisection BW≥P/4) and randomized hashing of memory locations over the distributed memory modules. Execution of instructions happens in steps corresponding to a single PRAM step during which each thread executes a single instruction.

Despite of the many aforementioned advantages, ESM systems have appeared difficult to realize in truly optimal fashion. A physically feasible memory unit (MU) making use of step cache and scratchpad techniques to support strong con-current memory access and multioperations is easily comprehensible as one key component of powerful emulated shared memory architecture like REPLICA (REmoving Performance and programmability LImitations of Chip multiprocessor Architectures), which is basically a configurable ESM. Such MU sends the outgoing memory references to the shared memory system as well as waits and receives possible replies therefrom. Unfortunately, in the prior art MU solution described below in more detail, the low-level implementation details are non-existent and the proposed arrangement requires relatively complex multiport step caches and scratchpads or complex sorting arrays and large node-wise buffers. In addition, the receive logic of the prior solution accesses both step cache and scratchpad during a single clock cycle and the performance of the latter one is spoiled by two step minimum latency for all memory operations. All this rules the already-available MU solution rather impractical.

Figure 3:
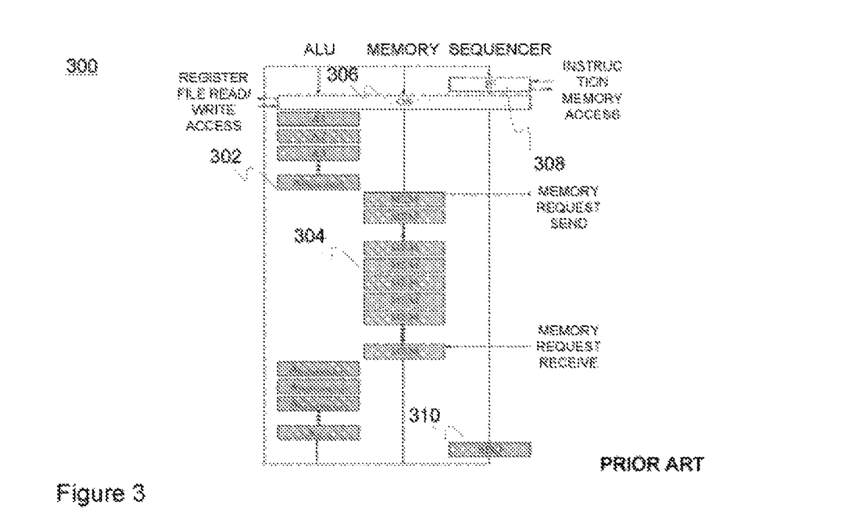
FIG. 3 is a high-level block diagram and pipeline representation of an embodiment of an MCRCW ESM processor.

FIG. 3 represents, at 300, a high-level block diagram and pipeline of a typical MCRCW ESM processor making use of step caches. A processor in a step cache-based MCRCW (C)ESM CMP comprises A ALUs, M memory units (MU), a distributed or unified register block, a sequencer and some glue logic. In the figure Ax 302 refers to ALU x, IF 308 refers to instruction fetch logic, MEM 304 refers to memory unit stage, OS 306 refers to operand selection logic and SEQ 310 refers to sequencer. As implied in the figure, there are ALUs 302 logically positioned prior to and after the memory unit wait segment.

Figure 4:
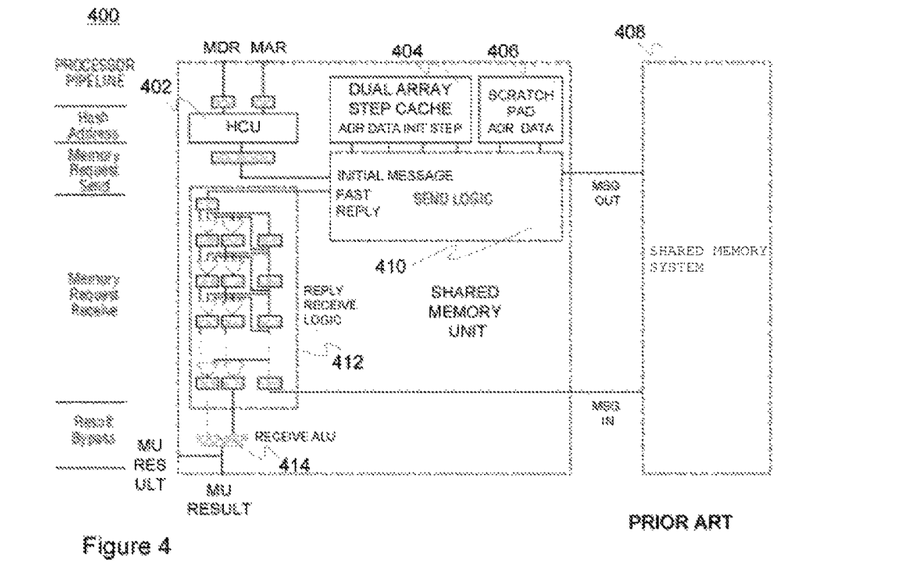
FIG. 4 illustrates a prior art version of a memory unit for a processor in MCRCW ESM CMP architecture.

With reference to FIG. 4, prior memory unit (MU) architecture 400 is reviewed hereinafter in more detail. In the visualized architecture, a (baseline) MU comprises a hash and compose unit (HCU) 402, send logic 410, dual array step cache 404, scratchpad 406, reply receive logic 412 and receive ALU 414.

The HCU 402 is responsible for computing the hash address for memory references and composing the outgoing memory reference messages out of memory data given in the MDR (memory data register) register, memory address given in the MAR (memory address register) register, thread identifier, memory operation from the operation register, and LSBs of the current step provided by a step counter.

Based on memory (sub)instruction, the send logic 410 accesses the step cache 404 and scratchpad 406 and sends the reference (memory request) on its way to the shared memory system 408 or calculates the internal memory operation result against the scratchpad data and gives the result as a fast reply directly to the reply receive logic 412.

The reply receive logic 412 is configured to receive incoming memory request reply messages from the shared memory system and send logic 410 (fast reply). It compares the address fields of these two and tries to set the received data registers of the threads in the receive logic. Two comparators per pipeline stage are needed because both replies and send logic data are moving against each other.

Step caches 404 (in which data stays valid only to the end of ongoing step of multithreaded execution) are utilized for implementing CRCW access to the shared memory system 408 without cache coherence problems by filtering processor and step-wisely out everything but the first references for each referenced memory location as mentioned hereinbefore. Each cache line preferably contains data, initiator (thread id of the first thread referring to the location specified by the address), and address tags. Two cache arrays and two ports are needed since the MU needs to access step cache from both send and receive stages of the pipeline that may carry threads belonging to different steps.

Each time the processor refers the shared memory system 408 a step cache search is performed. A hit is detected on a cache line if the line is in use, the address matches the address tag of the line, and the least significant bits of the current step of the reference match the two LSBs of the step of the line. In the case of a hit, a write is just ignored while a read is just completed by accessing the data from the cache. In the case of a miss, the reference is stored into the cache using the replacement policy and marked as pending (for reads). At the same time with storing the reference information to the cache line, the reference itself is sent to the shared memory system 408. When a reply of a read arrives from the shared memory system 408, the data is put to the data field of the step cache line storing the reference information and the pending field is cleared. Predetermined cache decay logic is exploited to care of invalidating the lines before their step field matches again to the least significant bits of current step.

In order to implement multioperations with step caches of limited associativity, separate dual port processor-level multioperation memories, scratch-pads, 406 are used. This is because there is a need to store the id of the initiator thread of each multioperation sequence to the step cache and internal initiator thread id register as well as reference information to a storage that saves the information regardless of possible conflicts that may wipe away information on references from the step cache. The scratchpad 406 has fields for data, address and pending for each thread of the processor. Multioperations can be implemented by using sequences of two instructions so that data to be written in the step cache 404 is also written to the scratchpad 406, id of the first thread referencing a certain location is stored to the step cache 406 and the Initiator register (for the rest of references), the pending bit for multioperations is kept in the scratchpad 406, the reply data is stored to the scratchpad 406, and reply data for the ending operation is retrieved from the scratchpad 406 (see Algorithm 1 in Table 1 below).

TABLE 1

Algorithm 1: Implementation of a two-step MPADD multioperation in the baseline MU PROCEDURE Processor::Execute::BMPADD ( Write_data , Write_Address )
Search Write_Address from the StepCache and put the result in matching_index
IF not found THEN
  IF the target line pending THEN
    Mark memory system busy until the end of the current cycle
  ELSE Read_data := 0
    StepCache[matching_index].data := Write_data
    StepCache[matching_index].address := Write_Address
    StepCache[matching_index].initiator_thread := Thread_id
    ScratchPad[Thread_id].Data := Write_data
    ScratchPad[Thread_id].Address := Write_Address
    Initiator_thread:=Thread_id
ELSE
  Read_data := StepCache[matching_index].data
  StepCache[matching_index].data:= Write_data + Read_data
  ScratchPad[Initiator_thread].Data := Write_data + Read_data
  Initiator_thread := StepCache[matching_index].Initiator_thread
PROCEDURE Processor::Execute::EMPADD ( Write_data , Write_Address )
IF Thread_id<>Initiator_thread THEN
  IF ScratchPad[Initiator_thread].pending THEN
    Reply_pending := True
  ELSE
    Read_data := Write_data + ScratchPad[Initiator_thread].Data
ELSE
  IF Write_Address = ScratchPad[Initiator_thread].Address THEN
    Send a EMPADD reference to the memory system with
    - address = Write_Address
    - data = ScratchPad[Initiator_thread].Data
    ScratchPad[Thread_id].pending := True TABLE 1-continued Algorithm 1: Implementation of a two-step MPADD multioperation in the baseline MU   ELSE
    Commit a Multioperation address error exception
PROCEDURE Module::Commit_access::EMPADD ( Data , Address )
Temporary_data := Memory [Address]
Memory[Address] := Memory[Address] + Data
Reply_data := Temporary_data
PROCEDURE Processor::Receive_reply::EMPADD ( Data , Address , Thread )
Read_Data[Thread] := Data | Read_Data[Thread]+Data
(if Thread≠Thread_id)
ScratchPad[Thread].Data := Data
ScratchPad[Thread].Pending := False
ReplyPending[Thread_id] := False
FOR each successor of Thread DO
  IF ReplyPending[successor] THEN
    Read_data[successor] := Read_data[successor] + Data
    ReplyPending[successor] := False The starting operation (BMPxxx for arbitrary ordered multiprefix operations) executes a processor-wise multioperation against a step cache location without making any reference to the external memory system. The ending operation (EMPxxx for arbitrary ordered multi-prefix operations) performs the rest of the multioperation so that the first reference to a previously initialized memory location triggers an external memory reference using the processor-wise multioperation result as an operand. The external memory references that are targeted to the same location may be processed in the active memory units of the corresponding memory modules according to the type of the multioperation and the reply data is sent back to the scratchpads of participating processors.

Alternative realizations of concurrent access ESM systems use cacheless variants of the Ranade's algorithm or real multiport memories: The Ranade's algorithm implements a shared memory abstraction relying on sorting and messaging of memory references on a top a physically distributed memory system. While this solution provides some advantages like an ability to implement fast multioperations (the MCRCW PRAM model), it also leaves room for improvements since every access includes consecutive sort and access phases requiring complex hardware sorters and buffers to store combined references on the nodes of the network. In addition, the existing architectures rely on a non-scalable interconnection topology. Real multiport memories provide concurrent access down to memory cell-level by replicating the access circuitry of each memory cell array by the number of concurrent memory ports. This increases the area taken by the access circuitries quadratically with respect to the number of ports (the size of the cells increase only linearly) making them impractical if the number of ports exceeds, say, four. Ordinary cache based architecture in which caches are located next to the processors cannot be used in advanced shared memory computing since cache coherence is at least as expensive to retain with efficient shared memory algorithms as the multiport memories.

SUMMARY OF THE INVENTION

The objective is to at least alleviate one or more problems described hereinabove not yet fully satisfactorily addressed by the known ESM arrangements, and to provide a feasible solution for enhanced memory access therein.

The objective is achieved by embodiments of a memory unit in accordance with the present invention.

Accordingly, in one aspect of the present invention a memory unit for handling data memory references of a multi-threaded processor with interleaved interthread pipeline in emulated shared memory (ESM) architectures, comprising a step cache defining associative cache memory array in which data stays valid till the end of ongoing step of multithreaded execution, said memory array incorporating a plurality of cache lines with data fields, each line, preferably exclusively, containing a data field for address tag and a data field thread id of the first thread referring to a data memory location specified by the address tag, a scratchpad defining a memory buffer for storing internal data of multioperations, such as intermediate results, said buffer including, preferably exclusively, a single data field for each thread of the processor, wherein the memory unit is configured to access the step cache for a cache search and scratchpad for retrieving or storing said internal data at different clock cycles and different stages of the processor pipeline during multioperation execution involving data memory references by the processor.

In one embodiment, the memory unit is configured to, in response to a data memory reference by a thread of the processor, access the step cache to determine whether an address matching the referenced memory address is found on the basis of address tags stored therein, and if this is the case, i.e. in the case of cache hit, to retrieve the thread id from the thread id data field of the step cache line of the matching address, and conversely, in the case of cache miss, to store the thread id of the current thread and address tag corresponding to the referenced memory address in the step cache using a predetermined data replacement policy.

In one other, preferably supplementary, embodiment, the memory unit further comprises a reply receive buffer for storing received memory reference data for the threads. The buffer is configured to receive incoming (reply) messages from the shared memory system.

The reply receive buffer may be a multiport buffer and contain e.g. two data arrays and two ports to accommodate data and e.g. 'pending' fields regarding two consecutive steps, whereupon the buffer is at least implicitly step-aware or step addressable. Further, thread id is preferably utilized for accessing the data.

In various embodiments, step data may be stored using e.g. a thread-specific data field or register. Also memory reference messages preferably include a field for step data.

In a further embodiment, the memory unit is configured to, in the case of step cache miss in connection with memory write or read operation, send a memory reference to a shared memory system for storing therein or retrieving the referenced data via the reply receive buffer, respectively, in the case of step cache hit in connection with write operation, to ignore the write operation, and in the case of step cache hit in connection with read operation, to pick up the result from the reply receive buffer with the retrieved or stored thread id.

In one further embodiment, the memory unit is configured, in connection with a multioperation, to access the scratchpad, i.e. store data thereto and retrieve data therefrom, with the retrieved or stored thread id in order to calculate an intraprocessor multioperation result, and to send it to the shared memory system, wherein the memory unit may be further configured to utilize both data received in the reply receive buffer from the shared memory system and said intra-processor result to determine the final multioperation result.

Still in a further embodiment, the memory unit is provided with a hash and compose unit (HCU) configured to access the step cache as described herein. The hash and compose unit is preferably coupled to the step cache via an access port, preferably a single access port potentially configured for exclusive use by the hash and compose unit. The hash and compose unit may be configured to a construct a memory reference message based on at least one element selected from the group consisting of: the memory operation indicated by the processor (e.g. in the operation register), memory address given (e.g. in the MAR register), memory data given (e.g. in the MDR register), thread id, least significant bits (LSBs) of the step counter, and the outcome of the step cache access (i.e. nature of the outcome of the cache search, depending on whether it was a hit or miss).

In some embodiments, the step cache may be implemented as a multi-way set associative step cache.

In some supplementary or alternative embodiments, the addresses therein may be hashed optionally utilizing a randomly selected hashing function, for example. The HCU is then utilized to compute the hash address for a memory reference.

Yet in a further embodiment, the memory unit is provided with a memory request send logic entity configured to access the scratchpad as described herein. The scratchpad may be accessed via an access port, preferably a single access port potentially configured for exclusive use by the send logic entity.

The send logic entity may be configured to send the memory references to the shared memory system in accordance with the memory messages provided by the hash and compose unit. Based on the memory operation, the send logic may be configured to determine intermediate results, or intra-processor results, of multi-operations and provide the internal data such as the outcome of internal memory (multi)operation as a (fast) reply towards the reply receive buffer preferably via a memory reply wait queue.

Indeed, in a related embodiment, the memory unit further comprises a reply wait queue associated with a number of pipeline stages, which queue connects the memory request send logic entity and the reply receive buffer so that e.g. fast replies from the send logic may be funneled in proper order towards to the reply receive buffer to timely retrieve the related memory reference result received from the shared memory and to subsequently derive the final result using a receive ALU.

In accordance with another aspect, a method for handling data memory references of a multi-threaded processor provided with interleaved inter-thread pipeline in emulated shared memory (ESM) architectures is provided, the method comprising obtaining a step cache (504) defining associative cache memory array in which data stays valid till the end of ongoing step of multithreaded execution, said memory array incorporating a plurality of cache lines with data fields, each line, preferably exclusively, containing a data field for address tag and a data field thread id of the first thread referring to a data memory location specified by the address tag, obtaining a scratchpad (506) defining a memory buffer for storing internal data of multioperations, such as intermediate results, said buffer including, preferably exclusively, a single data field for each thread of the processor, and accessing the step cache for a cache search and scratchpad to retrieve and/or store said internal data at different clock cycles and different stages of the processor pipeline during multioperation execution involving data memory references by the processor.

The various considerations presented herein concerning the various embodiments of the memory unit may be flexibly applied to the embodiments of the method mutatis mutandis and vice versa, as being appreciated by a person skilled in the art.

The utility of the present invention arises from a plurality of issues depending on each particular embodiment thereof. Generally, simultaneous memory references to a single memory address are implemented by means of step caches so that references by each processor are advantageously reduced to one during a single step of multi-threaded execution. Scratchpad memory is cleverly utilized to store intermediate data of multioperations.

Through the modification of the original memory unit structure and e.g. the step cache and scratchpad characteristics as described in this text regarding the corresponding access (pipeline) stage, accessing elements, and the data stored therein, a remarkably simplified hardware implementation has been obtained wherein the area of a step cache can be scaled down to 25% of that in the previously published version, the area of the scratchpad be reduced accordingly, the second ports in the step cache and scratchpad be eliminated and the complex receive reply logic with a high number of comparators be traded for a simpler receive buffer, yet still shortening the clock cycle by accessing both the modified step cache and scratchpad during different clock cycles.

The expression "a number of" refers herein to any positive integer starting from one (1), e.g. to one, two, or three.

The expression "a plurality of" refers herein to any positive integer starting from two (2), e.g. to two, three, or four.

The term "multioperation" may generally refer herein to associative cumulative operations such as actual multi-prefixes or other otherwise corresponding operations but having no return values sent back to processors in contrast to multi-prefixes, i.e. just the content of the target memory location being thus altered.

Different embodiments of the present invention are disclosed in the dependent claims.

BRIEF DESCRIPTION OF THE RELATED DRAWINGS

Next the invention is described in more detail with reference to the appended drawings in which.

DETAILED DESCRIPTION OF THE EMBODIMENTS

The memory unit (MU) in accordance with an embodiment of the present invention may be generally utilized in connection with an ESM computer architecture to implement e.g. CMP (chip multiprocessor) or MP-SOC (multiprocessor system on chip) system comprising a plurality of processor cores with dedicated instruction memories, associative step caches (retaining data inserted therein until the end of on-going step of multithreaded execution as managed by step-aware replacement policy) and non-associative (thread-addressed) scratchpad buffers attached to processors, and a physically distributed but logically shared data memory coupled via a high-bandwidth network such as a multi-mesh interconnection network to the processors (cores). The network connects processors to distributed memory modules so that sufficient throughput and tolerable latency can be achieved for random communication patterns with a high enough probability.

To maximize the throughput for read intensive portions of code, separate lines for references going from processors to memories and for replies from memories to processors may be utilized. Memory locations may be distributed across the data modules by a randomly or pseudo-randomly chosen polynomial. The architecture preferably implements concurrent memory access for advanced parallel algorithms, multioperations for computing prefixes and reductions optionally in constant time.

Multioperations may be implemented as a sequence of multiple, optionally two, consecutive instructions. During the execution of a multioperation such as a multi-prefix, first intra-processor multi-prefixes may be first determined, whereupon processor-wise results may be transmitted to active memory modules of the distributed shared memory elements to determine inter-processor multi-prefixes thereat (one result per processor) based on which the final multi-prefixes may be determined again within the processors themselves.

Figure 5:
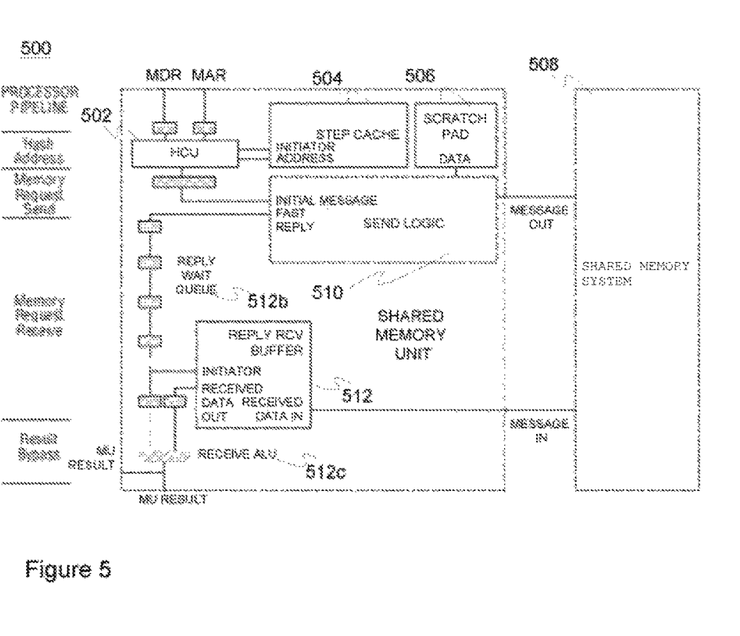
FIG. 5 illustrates an embodiment of a memory unit for ESM architectures in accordance with the present invention.

With reference to FIG. 5, an improved MU in accordance with an embodiment of the present invention is illustrated at 500 with a processor pipeline sketched on the left to facilitate understanding the roles of the included entities during the pipeline stages. The MU 500 comprises a hash and compose unit (HCU) 502, memory reference send logic entity 510, single array step cache 504, scratchpad 506, reply wait queue 512b, reply receive (RCV) buffer 512 and receive ALU 512c. The HCU 502 may compute the hash addresses for memory references, compose the outgoing memory reference messages based on the memory data given in the MDR register, memory address given in the MAR register, thread identifier, memory operation from the operation register and a predetermined number of LSBs of the step counter, as well as access the step cache to determine the status of the memory reference (already referenced or not by any thread during the current step of multithreaded execution).

Based on the operation, the memory reference send logic 510 accesses the scratchpad 506 and sends the reference on its way to the shared memory system or calculates the internal memory operation result utilizing the data in the scratchpad and yields the result as a (fast) reply to the memory reply wait queue 512b. The reply receive (RCV) buffer 512 receives incoming reply messages from the shared memory system 508 and is also accessed by the last stage of the multi-stage reply wait queue 512b to determine if a reply with the same initiator (thread id) has already arrived. In the negative case the pipeline can be suspended until the reply arrives. Otherwise, the reply is subjected to further processing in the receive ALU 512c depending on the operation. The reply receive (RCV) buffer 512 advantageously contains exclusively or at least two data arrays and two ports since it stores pending bits and data from two consecutive steps of multithreaded execution.

Each line in the step cache 504 associated with a processor may contain just the initiator and address tags. Single cache array and one access port is enough since the MU 500 needs to access the step cache 504 only from a single stage. Each time the processor refers the memory, a step cache search is performed. A hit is detected on a cache line if the line is in use and the address tag matches the tag of the line. In the case of a hit, a write is just ignored while a read is completed by accessing the initiator data from the cache and retrieving the result from the reply receive buffer (no reason to send the reference to the shared memory as this has been already done by the initiator thread).

In the case of a miss, the thread id is stored to the initiator field of the cache using the applied predetermined replacement policy. At the same time with storing the reference information to the cache line, the reference itself is sent to the shared memory system 508 and a pending bit is set. Upon receiving a reply for a read operation from the shared memory system 508, the data is put to the data field of the reply receive buffer 512 and the corresponding pending bit is cleared. Predetermined cache decay logic is used to invalid the lines between the steps of multithreaded execution.

Scratchpad 506 associated with the processor has also been redesigned such that the second port is eliminated and each scratchpad line may have a field for just data for each thread of the processor.

Multioperations are preferably implemented by using sequences of two instructions so that internal data is written to the scratchpad 506, initiator is stored to the step cache 504 and a so-called Initiator register (for linking the rest of references therewith, not shown in the figure), whereas the pending bit for multioperations is kept in the reply receive (RCV) buffer 512 rather than in the scratchpad 506, the reply data is stored to the reply receive (RCV) buffer 512 rather than to the step cache 504 or scratchpad 506, and the reply data for the ending operation of a multioperation is retrieved from the reply receive (RCV) buffer 512 rather than from the step cache 504 or scratchpad 506 (see Algorithm 2 in Table 2 for an example).

TABLE 2

Algorithm 2: Implementation of a two-step MPADD multioperation in an embodiment of the MU in accordance with the present invention PROCEDURE Processor::Execute::BMPADD ( Write_data , Write_Address )
Search Write_Address from the StepCache and put the result in matching_initiator
IF not found THEN
   StepCache[matching_initiator].address := Write_Address
   StepCache[matching_initiator].initiator_thread := Thread_id
   Initiator_thread:=Thread_id
ELSE Initiator_thread := StepCache[matching_index].Initiator_thread
On the next stage do
IF StepCache was hit during the last stage THEN
   Read_data := ScratchPad[Initiator_thread].data
   ScratchPad[Initiator_thread].data:= Write_data + Read_data
ELSE
Read_data:=0
PROCEDURE Processor::Execute::EMPADD ( Write_data , Write_Address )
Search Write_Address from the StepCache and put the result in matching_initiator
IF not found THEN
   Initiator_thread:=Thread_id
ELSE Initiator_thread := StepCache[matching_index].Initiator_thread
On the next stage do TABLE 2-continued Algorithm 2: Implementation of a two-step MPADD multioperation in an embodiment of the MU in accordance with the present invention IF StepCache was not hit during the last stage THEN
   Send a EMPADD reference to the memory system with
   -- address = Write_Address
   -- data = ScratchPad[Initiator_thread].Data
   ReplyReceiveBuffer[Initiator_thread,Step].Pending:=True;
PROCEDURE Module::Commit_access::EMPADD ( Data , Address )
Temporary_data := Memory [Address]
Memory[Address] := Memory[Address] + Data
Reply_data := Temporary_data
PROCEDURE Processor::Receive_reply::EMPADD ( Data , Address , Thread )
Read_Data:= ReplyReceiveBuffer
[Initiator_thread].Data+FastReply.Data
ReplyReceiveBuffer[Initiator_thread].Pending := False FIG. 6 discloses, by way of example only, a method flow diagram in accordance with an embodiment of the present invention. After method start-up 602, preparatory actions are performed, i.e. the MU for executing the method is obtained, such as the hosting (processor) chip manufactured or otherwise acquired, and configured together with the remaining ESM and support architecture (power supply, etc.) to execute the desired kind of program code exploiting parallel processing, the code being loaded to the instruction memories of the associated processors.

Figure 6:
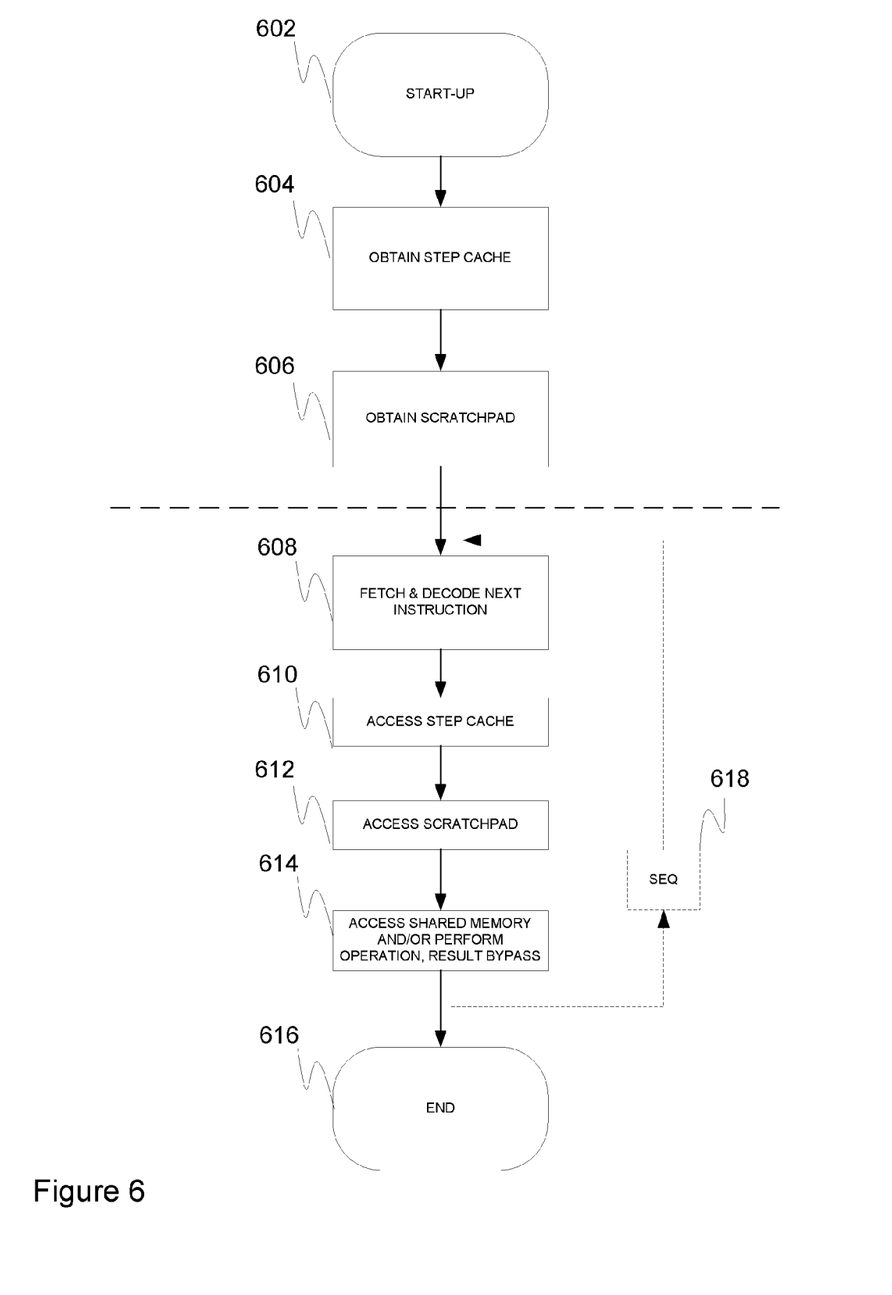
FIG. 6 illustrates an embodiment of a method in accordance with the present invention.

In particular, a step cache is obtained at 604, defining an associative cache memory array in which data stays valid till the end of ongoing step of multi-threaded execution, said memory array incorporating a plurality of cache lines with data fields, each line, preferably exclusively, containing a data field for address tag and a data field thread id of the first thread referring to a data memory location specified by the address tag.

At 606, a scratchpad is obtained, defining a memory buffer for storing internal data of multioperations, such as intermediate results, said buffer including, preferably exclusively, a single data field for each thread of the processor.

Upon code execution (method items disposed below the depicted broken vertical line), instructions present in the code are fetched and decoded 608 as described hereinbefore, whereupon the step cache is accessed 610 for a cache search and scratchpad is accessed 612 to retrieve and/or store said internal data at different clock cycles and different stages of the processor pipeline during multioperation execution involving data memory references by the processor. Shared memory access, operations on the references and results bypass may take place at 614. The shown items may be repeatedly executed in order to process different threads and new instructions as indicated by the dotted loop-back arrow in the figure. Seq 618 refers to instruction/program sequencing.

At 616, the method execution is ended, which typically takes place upon termination of program code execution.

The mutual ordering and overall presence of the method items of the method diagrams disclosed above may be altered by a skilled person based on the requirements set by each particular use scenario and e.g. requirements set by the memory operation associated with the instruction under execution.

Consequently, a skilled person may, on the basis of this disclosure and general knowledge, apply the provided teachings in order to implement the scope of the present invention as defined by the appended claims in each particular use case with necessary modifications, deletions, and additions, if any. Generally, the various principles set forth herein may be also utilized in processor architectures diverging from the one explicitly described, as being understood by the persons skilled in the art.

The invention claimed is:

1. A memory unit for handling data memory references of a multi-threaded processor provided with interleaved inter-thread pipeline in emulated shared memory architectures, the memory unit comprising:
a step cache defining associative cache memory array in which data stays valid until the end of an ongoing step of multithreaded execution, said cache memory array incorporating a plurality of cache lines with data fields, each of the plurality of cache lines containing a data field for address tag and a data field thread id of the first thread referring to a data memory location specified by the address tag;
a scratchpad defining a memory buffer configured to store internal data of multioperations, said buffer including a single data field for each thread of the processor,
wherein the memory unit is configured to access the step cache for a cache search and scratchpad for retrieving and/or storing said internal data at different clock cycles and different stages of the interleaved inter-thread pipeline of the multi-threaded processor during multioperation execution involving data memory reference by the multi-threaded processor.

2. The memory unit of claim 1, wherein the memory unit is configured to, in response to a data memory reference by a thread of the processor, access the step cache to determine whether an address matching the referenced memory address is found on the basis of address tags stored in the step cache, and
when the address matching the referenced memory address is found, to retrieve the thread id from the thread id data field of the step cache line of the matching address, and
when the address matching the referenced memory address is not found, to store the thread id of the current thread and address tag corresponding to the referenced memory address in the step cache using a predetermined data replacement policy.

3. The memory unit of claim 1, further comprising a reply receive buffer configured to store received memory reference data for the threads, the buffer being configured to receive incoming reply messages from the shared memory system.

4. The memory unit of claim 3, wherein the reply receive buffer is a multiport buffer and includes two data arrays and two ports to accommodate data and pending fields indicative of pending shared memory reference for the threads regarding two consecutive steps.

5. The memory unit of claim 1, wherein the memory unit is configured to, when a step cache miss in connection with memory write or read operation occurs, send a memory reference to a shared memory system for storing therein or retrieving the referenced data via a reply receive buffer, respectively,
when a step cache hit in connection with write operation occurs, ignore the write operation, and
when a step cache hit in connection with read operation occurs, pick up the result from the reply receive buffer with the retrieved or stored thread id.

6. The memory unit of claim 1, wherein the memory unit is configured, in connection with a multioperation, to access the scratchpad, by storing data thereto and retrieving data therefrom, with the retrieved or stored thread id in order to calculate an intra-processor multioperation result, and to send the intra-processor multioperation result to the shared memory system.

7. The memory unit of claim 1, wherein the memory unit is configured to utilize both data received in the reply receive buffer from the shared memory system and said intra-processor result to determine the final multioperation result, the multioperation being a multi-prefix.

8. The memory unit of claim 1, further comprising a hash and compose unit configured to access the step cache.

9. The memory unit of claim 8, wherein the hash and compose unit is configured to a construct a memory reference message based on at least one element selected from the group consisting of: the memory operation indicated by the processor, a memory address, memory data, a predetermined number of least significant bits of the step counter, and the outcome of the step cache access.

10. The memory unit of claim 8, wherein the hash and compose unit configured to access the step cache is coupled to the step cache via an access port, or
the hash and compose unit configured to access the step cache is coupled to the step cache via a single access port and is configured for exclusive use by the hash and compose unit.

11. The memory unit of claim 1, wherein the step cache is a multi-way set associative step cache.

12. The memory unit of claim 1, wherein the addresses in the step cache are hashed utilizing a randomly selected hashing function.

13. The memory unit of claim 1, further comprising a memory request send logic entity configured to access the scratchpad.

14. The memory unit of claim 13, wherein the send logic entity is configured to send the memory references to the shared memory system and to determine intermediate results, or intra-processor results, of predetermined multi-operations and provide the internal data as a local reply towards the reply receive buffer via a memory reply wait queue.

15. The memory unit of claim 13, wherein the memory request send logic entity configured to access the scratchpad is accessible via an access port, or
the memory request send logic entity configured to access the scratchpad is accessible via a single access port configured for exclusive use by the memory request send logic entity.

16. The memory unit of claim 13, wherein the internal data is the outcome of internal memory multioperation as the local reply.

17. The memory unit of claim 1, further comprising a reply wait queue associated with a number of pipeline stages, the reply wait queue connecting the memory request send logic entity and the reply receive buffer so that local replies from the send logic are able to be funneled in proper order towards to the reply receive buffer to timely retrieve the related memory reference received from the shared memory and to subsequently derive the final operation result using a receive arithmetic logic unit (ALU).

18. The memory unit of claim 1, wherein each of the plurality of cache lines, exclusively, contains the data field for address tag and the data field thread id of the first thread referring to the data memory location specified by the address tag.

19. The memory unit of claim 1, wherein the internal data of multioperations are intermediate results.

20. The memory unit of claim 1, wherein the buffer includes, exclusively, the single data field for each thread of the processor.

21. A method for handling data memory references of a multi-threaded processor provided with interleaved inter-thread pipeline in emulated shared memory architectures, the method comprising:
- obtaining a step cache defining associative cache memory array in which data stays valid until the end of ongoing step of multithreaded execution, said cache memory array incorporating a plurality of cache lines with data fields, each of the plurality of cache lines containing a data field for address tag and a data field for thread id of the first thread referring to a data memory location specified by the address tag;
- obtaining a scratchpad defining a memory buffer configured to store internal data of multioperations, said buffer including a single data field for each thread of the processor; and
- accessing the step cache for a cache search and scratchpad to retrieve and/or store said internal data at different clock cycles and different stages of the interleaved inter-thread pipeline of the multi-threaded processor during multioperation execution involving data memory references by the multi-threaded processor.

22. The method of claim 21, wherein each of the plurality of cache lines, exclusively, contains the data field for address tag and the data field thread id of the first thread referring to the data memory location specified by the address tag.

* * * * *